Jan. 22, 1957 W. C. HIRONIMUS 2,778,646

TONE ARM ASSEMBLY

Filed Oct. 9, 1951

INVENTOR.
WALTER C. HIRONIMUS

BY Ostrolenk & Faber

ATTORNEYS 2,778,646
Patented Jan. 22, 1957

2,778,646

TONE ARM ASSEMBLY

Walter C. Hironimus, Charlotte, Mich., assignor to Wilcox-Gay Corporation, Charlotte, Mich., a corporation of Michigan Application October 9, 1951, Serial No. 250,424

10 Claims. (Cl. 274—23)

My present invention relates to a home recording device and more particularly to a disc sound recorder and play-back unit utilizing a single tone arm for both making a record and playing back a record.

Heretofore in Patent No. 2,310,229 and application Serial No. 158,637, there was disclosed a structure utilizing the single tone arm for this purpose wherein the single tone arm is provided with a cutting stylus and a play-back stylus which at all times remains in position on the tone arm irrespective of the operation which the tone arm is called upon to perform at a particular time.

To play the various speed commercial recordings without changing needles means a compromise point on the needle, such as a two mil radius or a truncated point. To prevent record damage needle pressure must, therefore, be light.

For reproducing needle pressure should run between 10 and 20 grams. On the other hand, when the arm is arranged for cutting, needle pressure should range between 35 and 50 grams to get the proper depth of cut. But when as above-mentioned, only one tone arm is used for both recording and play-back, it is necessary to find means whereby the needle pressure can be varied depending on the operation that the tone arm is performing, that is, whether it is recording or playing back the record.

The essence of the present application is, therefore, to provide a simple means for changing the percentage of the weight of the tone arm being supported by the stylus during the different operations so that the full weight of the arm will be supported by the stylus when cutting the record, and a considerably smaller portion when playing microgroove and 78 R. P. M. recordings.

This is accomplished by the application of a latching snap-out type of spring counterbalance, this spring being a metal strip pivoted near the center of the tone arm by a lateral pin suitably attached to the tone arm.

One end of this spring is put under pressure by means of a latch and latch plate arrangement at the rear of the tone arm, the said pressure being transmitted to the needle end of the tone arm by means of a screw arrangement which is also used to adjust the pressure exerted by the spring on the tone arm.

In the operation of my novel recording play-back device, the tone arm is so arranged that the rear end thereof, i. e., the end opposite the stylus is not only arranged to pivot in a horizontal direction in order to enable the tone arm to traverse a horizontal disc but is also arranged so that it may slide vertically, the tone arm being also pivoted for rotation in a vertical plane.

When the pivot end of the tone arm is raised, then the tone arm is engaged with an appropriate mechanical drive adapting it for operation as a record maker. In this case, the tone arm makes a substantial angle with the turn table. The cutting stylus is so mounted on the tone arm that when the tone arm is at this substantial angle, the cutting stylus engages the record on the turn table. The play-back stylus is mounted closer to the pivot on the tone arm than the cutting stylus.

The play-back stylus is so arranged that when the tone arm is elevated at the cutting angle, the play-back stylus is lifted up above the surface of the record. Conversely, when the tone arm pivot is lowered so that the tone arm is substantially in a horizontal position, the play-back stylus engages the record surface and the cutting stylus is elevated from the record surface.

This operation is performed simply by raising or lowering the pivot end of the tone arm and without the necessity for any manipulation of either of the styli; thus the cutting stylus and the play-back stylus may be permanently or semi-permanently mounted in the cartridge, being so arranged that they need not be replaced in changing from a cutting to a play-back operation and back again. The only removable mounting then required for either of the styli is that which is necessary to facilitate replacement as the styli wear out.

The main object of the present invention is to provide simple means of changing the percentage of weight of the tone arm being supported by the needle so that the full weight of the arm will be supported by the needle when cutting the record and a considerably smaller portion when playing microgroove or 78 R. P. M. recordings.

Another object of my invention is the provision of means whereby this percentage of weight can be easily regulated.

These and other objects of my present invention will become apparent in the following description and drawings in which.

Figure 1:
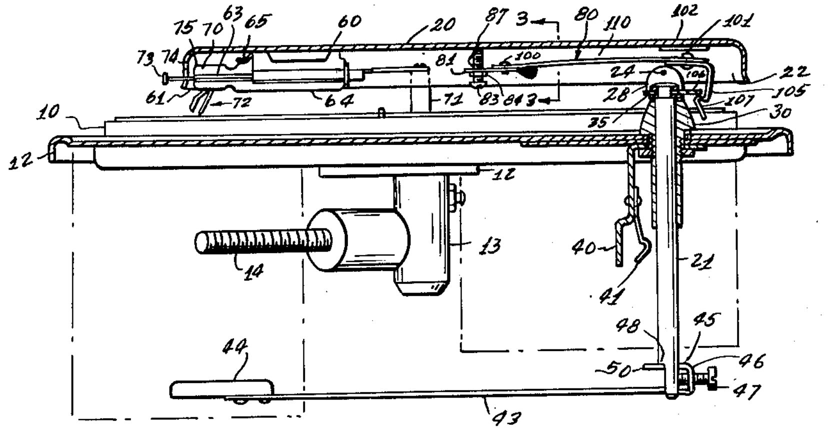
Figure 1 is a vertical cross-section of the recording and play-back machine showing the tone arm in the play-back position.

Referring now to the figures, essentially the operation of the device is quite similar to that described in Patent No. 2,310,229 and the basic nature of the cutting and play-back operation is quite similar to that described in Patent No. 2,351,948.

For this reason, and since the invention does not relate thereto, the drive motor and its connection to the turn table, the sound system including the amplifier, loud speaker and microphone and the electrical connections including the selector switch for the various operations have been omitted from the drawings.

It is sufficient here to point out that the appropriate mechanical operation of the device requires that the turn table 10 be driven in any suitable manner at the appropriate recording or play-back speed; and one of the methods by which it may be driven is shown in Patent No. 2,351,948. The turn table 10 has a spindle 11 which rotates with the turn table in an appropriate bearing in the base plate 12. Spindle 11 is carried down into the gear box 13 where through an appropriate speed reduction gearing arrangement it drives the tone arm feed screw 14.

The tone arm 20 is pivotally mounted for rotation in a vertical plane on the pivot post 21, i. e., the tone arm 20 is actually a channel-shaped member having the side flanges 22, 22 which are provided adjacent the rear thereof with the needle bearings 24, one of which may be adjustable in order to permit simplified replacement of the tone arm and simplified adjustment of the bearing.

The needle bearings 24 engage appropriate openings in the channel-shaped member 28 which is rigidly secured to the top of the pivot post 21. Pivot post 21 is in turn slidably and rotatably mounted in the journal 30 which is secured in an appropriate opening 31 in base plate 12.

When the pivot post 21 is in the lower position of Figure 1, the washer 35 at the upper end of pivot post 21 rests on the upper surface of the journal 30 to limit the downward movement of the pivot post 21. The tone arm 20 is then in the lower horizontal position of Figure 1.

A bracket 40 is provided beneath the base plate 12 adjacent the journal 30, the bracket 40 having a spring latch 41 secured thereto. The lower end of the post 21 has secured thereto the feed arm 43 having the feed pawl 44. The feed arm 43 is reentrantly bent at 45 to provide a channel-shaped section having the wall 46 through which a clamping screw 47 may be passed to secure the feed arm 43 to the lower end of post 21. The lower end of post 21 may be shouldered at 48 so that the feed arm 43 may be accurately positioned thereat. Section 45 of the feed arm 43 has an extension 50 which cooperates with the spring latch 41 when the pivot post 21 is raised to maintain the pivot post 21 in the raised position of Figure 2.

Figure 2:
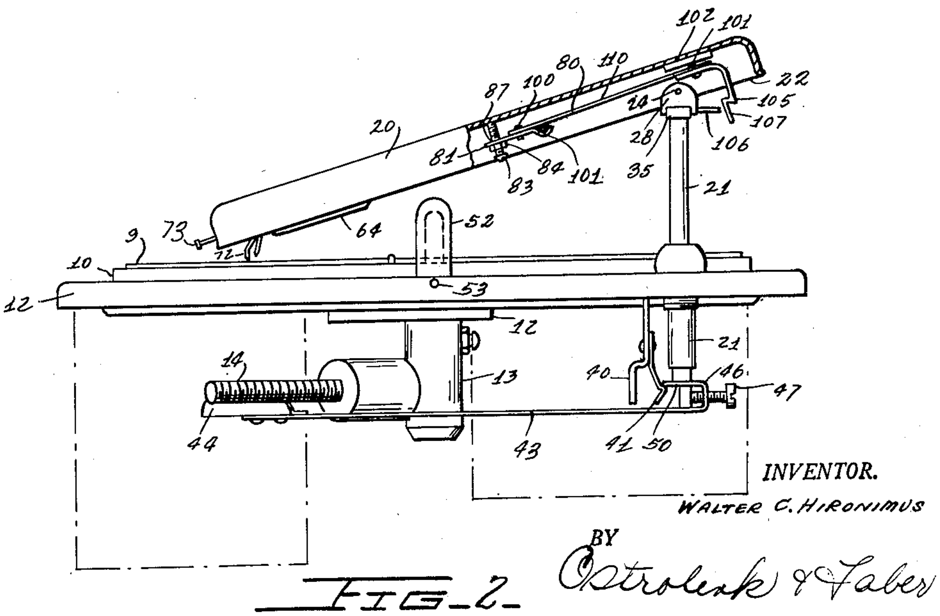
Figure 2 is a vertical cross-section of the recording and play-back machine showing the tone arm in the recording position.

The spring latch 41 is so arranged that it will support readily the load of the pivot post 21 and the tone arm 20; but hand pressure at the pivot area end of the tone arm 20 in a downward direction will serve to deflect the spring latch 41 and permit the pivot post 21 and the tone arm 20 to slide from the position of Figure 2 to the position of Figure 1.

When the tone arm 20 is in the position of Figure 1, which is the play-back position, the tone arm 20 is freely rotatable about its rear pivot, i. e., the pivot post 21 is freely rotatable in the journal and hence the tone arm may rotate freely in a horizontal plane for play-back purposes.

When the tone arm 20 and the pivot post 21 are raised to the position shown in Figure 2, then the feed pawl 44 on the feed arm 43 engages the feed screw 14. Now the tone arm 20 is no longer freely rotatable in a horizontal plane but will move in a horizontal plane under the control of and as it is fed by the feed screw 14.

The feed screw 14 is, as above pointed out, operated in accordance with the rotation of the turn table 10. Consequently, when the tone arm 20 is raised to the record making position of Figure 2, it will traverse the record 9 on the turn table 10 only as predetermined by the rotation of the turn table 10.

When the tone arm 20 is moved down to the position of Figure 1, it is disconnected from the feed screw drive so that the horizontal traverse of the tone arm 20 will then be under the control of the grooves in the record *9a* on the turn table 10. When the tone arm 20 is in the lowered position, it may also be swung outside the periphery of the turn table and rested on the tone arm rest 52 which is secured by bolt 53 to the base plate 12.

Figure 3:
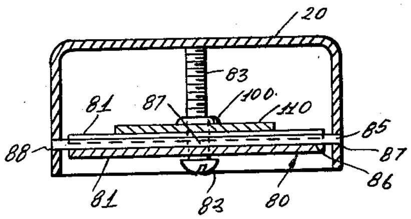
Figure 3 is a cross-sectional view taken on line 3—3 of Figure 1 looking in the direction of the arrows.

The tone arm 20 at its forward end is provided with the channel shaped spring bracket 60 having the detents 61 adapted to receive and retain the peripheral flange 63 of the crystal cartridge 64 as shown in Figure 3.

The forward end of the top wall of channel 60 carries the leaf spring extension 65 which bears against the top of the cartridge 64 ensuring that the cartridge 64 is held resiliently in the appropriate position for cooperation with the tone arm 20. The forward section 70 of the cartridge 64 is provided with the opening 71 in which the cutting-reproducing needle 72 may be inserted to be clamped therein by the set screw 73 passing through the opening 74 in the front wall of tone arm 20 and the threaded opening 75 in the front of section 70 of cartridge 64.

Needle 72 is made of two styli, the cutter 77 and the reproducer 78. The cutting stylus 77 has an offset lock 79 to which the reproducing stylus 78 is secured by soldering.

The spring assembly 80 as shown in Figures 1 and 2 and in section in Figure 3 is made up of the following main parts: a leaf spring 110, a metal strip 81, a light spring 105 and a screw 83 with holding nut 84. The leaf spring 110 is riveted at one end on the metal strip 81 which has a hole 87 through which adjustment screw 83 can transmit the pressure of this spring 110 to the top of the tone arm 20 and can adjust said pressure; screw 83 is held in place by nut 84. Metal strip 81 has at the end, opposite hole 87, a half cylinder recess 86 housing pin 85 which is held in position by aligned openings 87 and 88 in the side of the tone arm.

Light spring 105 has a latch at its lower end and is secured in a suitable way, for example, riveting, to the stiff leaf spring 110 at the other end, as shown in 101. Latch 107 of light spring 105 can engage latch plate 106 fastened to pivot post 21. As mentioned above, only a fraction of the total weight of the tone arm 20 is needed to play back record *9a*. This fraction of weight of the tone arm 20 is provided by the difference between the weight of the tone arm 20 and the pressure exerted upwardly by the spring system 80 when latch 107 of light spring 105 is engaged by latch plate 106 of pivot post 21.

The fraction of weight of tone arm 20 is applied to the reproducing stylus 78 since, as shown in Figure 1, when the tone arm 20 is in the horizontal position, only reproducing stylus 78 is in engagement with record *9a*.

For the record cutting operation instead, not only is pivot post 21 raised but also latch 107 is snapped out from engagement with latch plate 106. This way the whole weight of tone arm 20 is supplied to the recording stylus 77 which is now engaging record 9 as shown in Figure 2 since tone arm 20 is raised to its recording position. In case very shallow records are to be played back, in most cases a greater weight is needed. This can be obtained by just snapping latch 107 out of engagement with latch plate 106 without raising considerably the tone arm 21 so that the full weight of tone arm 20 or the full weight of tone arm 20 plus pressure from spring assembly 80 is supplied to the play-back stylus 77.

When latch 107 is snapped out of engagement of latch plate 106, spring 110 hits the interior of tone arm 20 with considerable force; to avoid this effect, a felt pad 102 can be placed either directly on rivet 101 or secured to the interior of the tone arm opposite rivet 101.

The reason why an adjustable screw 83 is placed in hole 87 is because in order to make this invention practical for production it is necessary to make the spring pressure adjustable and as mentioned above spring 83 can adjust said pressure. To make the latching easier from an operational standpoint, spring 105 is made from a thinner stock than that used to make the stiff spring 110.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. A tone arm having a sound translating element at one end and being pivotally mounted on an axially rotatable vertical post for rotation in a vertical plane, said sound translating element having a stylus, means varying the pressure on said stylus, said means comprising a spring, a metal plate secured to one end of said spring, said metal plate and said spring being pivoted for rotation in a vertical plane; means transmitting the upward pressure of said spring through said metal plate to said tone arm; a latch attached to the other end of said spring; a latch plate secured to said vertical post; said latch engaging said latch plate for low pressure on said stylus, said latch disengaging said latch plate for higher pressure on said stylus.

2. A tone arm having a sound translating element at one end and being pivotally mounted on an axially rotatable vertical post for rotation in a vertical plane, said sound translating element having a stylus, means varying the pressure on said stylus, said means comprising a spring extending for a substantial part of said tone arm interiorly to said tone arm, a metal plate secured to one end of said spring, said metal plate and said spring being pivoted for rotation in a vertical plane, means transmitting the upward pressure of said spring through said metal plate to said tone arm; a latch attached to the other end of said spring; a latch plate secured to said vertical post; said latch engaging said latch plate for low pressure on said stylus, said latch disengaging said latch plate for higher pressure on said stylus.

3. A tone arm having a sound translating element at one end and being pivotally mounted on an axially rotatable vertical post for rotation in a vertical plane, said sound translating element having a stylus, means varying the pressure on said stylus, said means comprising a spring, a metal plate secured to one end of said spring, said metal plate and said spring being pivoted for rotation in a vertical plane; means transmitting the upward pressure of said spring through said metal plate to said tone arm, means regulating said pressure; a latch attached to the other end of said spring; a latch plate secured to said vertical post; said latch engaging said latch plate for low pressure on said stylus, said latch disengaging said latch plate for higher pressure on said stylus.

4. A tone arm having a sound translating element at one end and being pivotally mounted on an axially rotatable vertical post for rotation in a vertical plane, said sound translating element having a stylus, means varying the pressure on said stylus, said means comprising a spring, a metal plate secured to one end of said spring, said metal plate and said spring being pivoted for rotation in a vertical plane, a screw through said metal plate transmitting the upward pressure of said spring to said tone arm, said screw also regulating said upward pressure of said spring, nut means securing said screw in place, a latch attached to the other end of said spring; a latch plate secured to said vertical post; said latch engaging said latch plate for low pressure on said stylus, said latch disengaging said latch plate for higher pressure on said stylus.

5. A tone arm having a sound translating element at one end and being pivotally mounted on an axially rotatable vertical post for rotation in a vertical plane, said sound translating element having a stylus, means varying the pressure on said stylus, said means comprising a spring, a metal plate secured to one end of said spring, said metal plate and said spring being pivoted for rotation in a vertical plane; means transmitting the upward pressure of said spring through said metal plate to said tone arm; a latch attached to the other end of said spring; a latch plate secured to said vertical post; said latch engaging said latch plate for low pressure on said stylus, said latch disengaging said latch plate for higher pressure on said stylus, means absorbing impact of said spring at latch disengaging operation.

6. In sound recording and reproducing apparatus, a turn table and means for driving the same; an operating arm carrying a sound translating element at one end and secured at the other end on a vertical post, said post being rotatable in a journal; said post carrying a feed arm; driving means for said feed arm; means for pivotally supporting said post in said journal in one position with the feed arm disengaged from its driving means; said post being slidable to another raised position in said journal and means for pivotally supporting said post in said other position for engaging said feed arm with its driving means, said sound translating element having two styli mounted therein, said styli and said post being in substantially linear arrangement, the stylus nearer said post being a reproducing stylus, and the stylus more remote from said post being a recording stylus, the recording stylus engaging a record on said turn table when said post is raised; and the reproducing stylus disengaging said record when the post is raised, the reproducing stylus engaging a record on said turn table when the post is lowered; and the recording stylus disengaging said record when the post is lowered, means varying the pressure on said styli, said means comprising a spring, a metal plate secured to one end of said spring, said metal plate and said spring being pivoted for rotation in a vertical plane, means transmitting the upward pressure of said spring through said metal plate to said operating arm, a latch attached to the other end of said spring; a latch plate secured to said vertical post; said latch engaging said latch plate at the low position of said post for low pressure on said reproducing stylus, said latch disengaging said latch plate at the raised position of said post for higher pressure on said recording stylus.

7. In a sound recording and reproducing apparatus, a turn table and means for driving the same; an operating arm carrying a sound translating element at one end and secured at the other end on a vertical post, said post being rotatable in a journal; said post carrying a feed arm; driving means for said feed arm; means for pivotally supporting said post in said journal in one position with the feed arm disengaged from its driving means; said post being slidable to another raised position in said journal and means for pivotally supporting said post in said other position for engaging said feed arm with its driving means, said sound translating element having two styli mounted therein, said styli and said post being in substantially linear arrangement, the stylus nearer said post being a reproducing stylus, and the stylus more remote from said post being a recording stylus, the recording stylus engaging a record on said turn table when said post is raised; and the reproducing stylus disengaging said record when the post is raised, the reproducing stylus engaging a record on said turn table when the post is lowered; and the recording stylus disengaging said record when the post is lowered, means varying the pressure on said styli, said means comprising a spring, a metal plate secured to one end of said spring, said metal plate and said spring being pivoted for rotation in a vertical plane, means transmitting the upward pressure of said spring through said metal plate to said operating arm, a latch attached to the other end of said spring; a latch plate secured to said vertical post; said latch engaging said latch plate at the low position of said post for low pressure on said reproducing stylus, said latch disengaging said latch plate at the raised position of said post for higher pressure on said recording stylus, said latch disengaging said latch plate at the low position of said post for intermediate pressure in said reproducing stylus.

8. In sound recording and reproducing apparatus, a turn table and means for driving the same; an operating arm carrying a sound translating element at one end and secured at the other end on a vertical post, said post being rotatable in a journal; said post carrying a feed arm; driving means for said feed arm; means for pivotally supporting said post in said journal in one position with the feed arm disengaged from its driving means; said post being slidable to another raised position in said journal and means for pivotally supporting said post in said other position for engaging said feed arm with its driving means, said sound translating element having two styli mounted therein, said styli and said post being in substantially linear arrangement, the stylus nearer said post being a reproducing stylus, and the stylus more remote from said post being a recording stylus, the recording stylus engaging a record on said turn table when said post is raised; and the reproducing stylus disengaging said record when the post is raised, the reproducing stylus engaging a record on said turn table when the post is lowered; and the recording stylus disengaging said record when the post is lowered, means varying the pressure on said styli, said means comprising a spring interiorly to said operating arm, a metal plate secured to one end of said spring, said metal plate and said spring being pivoted for rotation in a vertical plane, means transmitting the upward pressure of said spring through said metal plate to said operating arm, a latch attached to